(12) United States Patent
Hursey et al.

(10) Patent No.: US 8,712,410 B2
(45) Date of Patent: *Apr. 29, 2014

(54) SYSTEMS AND METHODS FOR DYNAMICALLY MODIFYING SUBCRIBER SERVICE PROFILE STORED IN HOME LOCATION REGISTER WHILE ROAMING IN WIRELESS TELECOMMUNICATION NETWORKS

(71) Applicant: AT&T Mobility II LLC, Atlanta, GA (US)

(72) Inventors: John T. Hursey, Lawrenceville, GA (US); Alan Johns, Stone Mountain, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/691,570

(22) Filed: Nov. 30, 2012

(65) Prior Publication Data

US 2013/0095828 A1 Apr. 18, 2013

Related U.S. Application Data

(63) Continuation of application No. 11/842,726, filed on Aug. 21, 2007, now Pat. No. 8,326,283.

(60) Provisional application No. 60/829,197, filed on Oct. 12, 2006.

(51) Int. Cl.
*H04W 4/00* (2009.01)

(52) U.S. Cl.
USPC ............ 455/433; 455/432.2; 455/432.4; 455/435.2; 455/436; 455/456.1; 370/328

(58) Field of Classification Search
USPC ............ 455/404.2, 432.2, 432.3, 433, 435.1, 455/436, 456.1; 370/328–338, 320
See application file for complete search history.

(56) References Cited

U.S. PATENT DOCUMENTS

| | | | |
|---|---|---|---|
| 6,108,540 A | 8/2000 | Sonti et al. | |
| 6,330,586 B1 * | 12/2001 | Yates et al. | 709/201 |
| 6,584,312 B1 * | 6/2003 | Morin et al. | 455/433 |
| 6,622,016 B1 * | 9/2003 | Sladek et al. | 455/414.1 |
| 7,477,632 B1 * | 1/2009 | Radhakrishnan et al. | 370/338 |
| 8,326,283 B1 * | 12/2012 | Hursey et al. | 455/432.1 |
| 2002/0049049 A1 | 4/2002 | Sandahl et al. | |
| 2002/0152203 A1 | 10/2002 | Ostergaard et al. | |

(Continued)

OTHER PUBLICATIONS

U.S. Office Action dated Sep. 13, 2010 in U.S. Appl. No. 11/842,726.

(Continued)

*Primary Examiner* — Quan M Hua
(74) *Attorney, Agent, or Firm* — Hartman & Citrin LLC

(57) ABSTRACT

In a wireless telecommunication system, Home Location Register logic generates a subscriber roaming profile for use by a Visitor Location Register by retrieving a subscriber's provisioned profile, retrieving a rule set associated with the subscriber, and applying the rule set to the set of provisioned service features indicated in the provisioned profile to generate a modified profile. The rules can be responsive to one or more of: the identity of the visited network, subscriber preferences, and provisioned features. The rules can be in the form of tables stored in the Home Location Register.

20 Claims, 8 Drawing Sheets

(56) References Cited

U.S. PATENT DOCUMENTS

| | | |
|---|---|---|
| 2003/0036383 A1* | 2/2003 | Zawislak et al. ............... 455/433 |
| 2003/0100302 A1* | 5/2003 | Armbruster et al. ........... 455/433 |
| 2004/0018836 A1 | 1/2004 | Jang |
| 2004/0018857 A1 | 1/2004 | Asokan et al. |
| 2004/0095327 A1 | 5/2004 | Lo |
| 2004/0215726 A1 | 10/2004 | Arning et al. |
| 2005/0071778 A1 | 3/2005 | Tokkonen |
| 2007/0288578 A1 | 12/2007 | Pantalone |
| 2009/0150322 A1 | 6/2009 | Bower et al. |
| 2010/0265181 A1 | 10/2010 | Shore |

OTHER PUBLICATIONS

U.S. Office Action dated Feb. 2, 2011 in U.S. Appl. No. 11/842,726.
U.S. Office Action dated Mar. 8, 2012 in U.S. Appl. No. 11/842,726.
U.S. Notice of Allowance dated Jul. 23, 2012 in U.S. Appl. No. 11/842,726.

* cited by examiner

| GENERAL HLR TABLE |||||
|---|---|---|---|
| IMSI | PROVISIONED PROFILE | VLRS ON WHICH ROAMING OK | PREFERRRD PROFILE |
| XXXXXXXX | XXXXXXXXXX XX XXXXXX XXXX ... XXXXXXXX | XXXX - XXXX | D |
| 310XXXXXX | XXXXX XXXXX XXXXXXX ... XXXXXX XXX | XXXX - XXXX | A |
| | | | |

| PREFERRED PROFILE TABLE |||| 
|---|---|---|---|
| PREFERRED PROFILE NO. | FEATURE (AND ANY PARAMETERS) | ACTION | ADV. SCREENING NO. |
| A | CFB=Deactive<br>CFNR=Deactive<br>CW=Active<br>MPTY<br>SOA=Yes<br>OCSI: SK=10, SCP Add=X,<br>  CAP2, SCF Unavail=Release | MODIFY<br>MODIFY<br>MODIFY<br>DELETE<br>ADD<br>MODIFY | 1 |
| B | OCSI: SK=10, SCP Add=X,<br>  CAP2,<br>  SCFUnavail=Release | MODIFY | 1 |
| C | SOA=Yes | ADD | 2 |

FIG. 7

| ADVANCED SCREENING TABLE |||
|---|---|---|
| ADV. SCREENING NO. | FROM VLR DIGITS | TO VLR DIGITS |
| 1 | 1222 | 1230 |
| 2 | 5555 | 6666 |
| 3 | 17777777777 | 17777777777 |

FIG. 8

| DYNAMIC SCREENING TABLE |||||
|---|---|---|---|
| FROM VLR DIGITS | TO VLR DIGITS | FEATURE (AND ANY PARAMETERS) | ACTION |
| 1222 | 1230 | OCSI: SK=10, SCP Add=Y, CAP2, SCF Unavail=Release | MODIFY |
| | | MPTY | DELETE |
| | | SOA=Yes | MODIFY |

FIG. 9

SYSTEMS AND METHODS FOR DYNAMICALLY MODIFYING SUBCRIBER SERVICE PROFILE STORED IN HOME LOCATION REGISTER WHILE ROAMING IN WIRELESS TELECOMMUNICATION NETWORKS

CROSS REFERENCE TO RELATED APPLICATIONS

This application is a continuation of U.S. patent application Ser. No. 11/842,726, filed Aug. 21, 2007, now U.S. Pat. No. 8,326,283, which claims the priority to U.S. Provisional Patent Application Ser. No. 60/829,197, filed Oct. 12, 2006; the contents of which are hereby incorporated by reference herein in their entirety into this disclosure.

BACKGROUND OF THE INVENTION

1. Field of the Invention

The present invention relates generally to wireless (e.g., cellular) telecommunication networks and, more specifically, to controlling network services or features to which a roaming user has access.

2. Description of the Related Art

The term "roaming" refers to a user (also referred to as a subscriber) operating a cellular telephone or other mobile station on a wireless network other than that operated by the carrier to whose services the user subscribes (via a subscription agreement, etc.). The network operated by the user's carrier is sometimes referred to with respect to a user as the "home network," and the network on which the user is roaming is sometimes referred to as the "visited network." The carrier that operates the home network typically has contractual "roaming agreements" with other carriers (sometimes referred to as roaming partners) that allow each carrier's subscribers to roam on the other's network.

When a mobile station initially moves into or powers-up in a network other than the home network and detects a signal that indicates the visited network may be one in which the mobile station can operate, the mobile station attempts to register with the visited network. A registration involves an exchange of messages between the Home Location Register (HLR), which is part of the home network, and a Visitor Location Register (VLR), which is part of the visited network. Specifically, in networks that conform to the Global System for Mobile telecommunications (GSM) standard, the VLR sends an Update Location (UL) message to the home network, indicating the identity of the visiting mobile station and requesting subscriber data relating to that mobile station. In response to the UL message, the HLR sends an Insert Subscriber Data (ISD) message to the visited network. The ISD message contains subscriber information that indicates, among other things, the services to which the roaming mobile station is to have access.

A carrier may offer a variety of network-based "services" (also referred to as "features") to which a customer can subscribe or otherwise be given access in addition to the basic service of wireless voice telephony using the home network. The act of the carrier giving (or restricting) access to selected services and setting data values relating to such selected services is commonly referred to as "provisioning" the subscriber's account. Common examples of services include voicemail, calling line identification, call forwarding, call waiting, text messaging, Internet access, international roaming, prepaid roaming, call blocking, etc. While some services are common and supported by many networks, other services are not. Thus, while a subscriber may have access to all services covered by the subscription when operating on the home network, the subscriber may have access to fewer services when roaming.

The logic by which a conventional HLR operates is typically embodied in a single table that lists each subscriber (e.g., by International Mobile Station Identification number) and a corresponding list of services. For convenience, the HLR table may designate each subscriber as either an "Entitlement" (E) subscriber or "Restriction" (R) subscriber. The services listed as corresponding to an E subscriber are those to which the subscriber's mobile station is to have access; the mobile station is not to have access to any services that are not listed. The services listed as corresponding to an R subscriber are those to which the subscriber's mobile station is to be restricted from accessing; the mobile station is to have access to all other services that are supported but not listed. The E/R designation is commonly believed to be more efficient than, for example, listing in all cases all services to which subscribers are to have access or listing in all cases all services from which subscribers are to be restricted from accessing. For example, in a case in which a subscriber is to have access to only a single service, it is more efficient to designate the subscriber as an E and list the single feature than to designate the subscriber as an R and list dozens of features. However, in a case in which a subscriber is to have access to a package or bundle of many services, it is more efficient to designate the subscriber as an R and list only the few to which the subscriber is not to have access.

The issue of subscribers having access to fewer services while roaming than while operating on the home network has been addressed in part by CAMEL, which is an acronym for Customized Applications for Mobile-Network Enhanced Logic. CAMEL is a protocol that allows roaming subscribers to access intelligent network features, such as voicemail and conditional call forwarding, to which they subscribe on their home network but that might otherwise not be supported by a visited network. CAMEL works by directing requests for such services back to the home network, which provides the logic for operating the service. When a mobile station registers in a system that supports CAMEL, the ISD message that the HLR sends includes Originating CAMEL Subscription Information (OCSI), identifying the services that are supported via CAMEL and providing related parameters. The VLR responds to the ISD message with an Insert Subscriber Data Result (ISDR) message, indicating whether the visited network supports the feature. In this manner, the set of features accessible to the roaming mobile station is established.

In some cases, the set of features accessible to the mobile station is further limited by the home network. For example, even though a subscriber may have access to service "A" on the home network (and in some instances certain other networks), the carrier may prevent the subscriber from having access to service "A" on another network because the carrier believes its roaming partner does not properly support service "A" on its network. Some services involve more parameters than simply providing such a service or not, and a carrier may believe that if the other network does not or cannot set the parameters in the same way as the carrier, that the subscriber should simply be denied access to that service when visiting the other network. For example, a carrier may allow a user to access CAMEL service when roaming on network "X" but entirely prevent the user from accessing CAMEL service when roaming on network "Y" simply because network "Y" does not utilize one or more of the CAMEL parameters in the way the carrier deems proper.

In summary, the set of services accessible to a roaming mobile station is limited by: (a) the set of services for which the mobile station is provisioned, i.e., to which the subscriber subscribes; (b) the set of services that the visited network supports; and (c) the set of services that the home network permits the mobile station to access on the visited network. The logic that is conventionally employed to determine the set of services to which a roaming subscriber is to have access is essentially no more complex than such a logical "AND" operation among (a), (b) and (c).

SUMMARY

Embodiments of the present invention provide a system and method for generating a subscriber profile to be used when a subscriber to wireless mobile telecommunication service is roaming. In an exemplary embodiment, the method includes retrieving the subscriber's provisioned profile (e.g., from a database such as that of the network's Home Location Register (HLR)), retrieving a rule set associated with the subscriber, and applying the rule set to the set of provisioned service features indicated in the provisioned profile to generate a modified profile to be used while roaming on the visited network. Note that the term "profile" is used herein for convenience and that various terms are commonly used in the art to refer to list or set of provisioned services for each subscriber maintained in the HLR.

The rules can be responsive to: the identity of the visited network itself (e.g., by its Visitor Location Register (VLR) number); subscriber preferences; features or combinations of features to which the provisioned profile indicates the subscriber subscribes; or any suitable combination thereof. In the exemplary embodiment of the invention, the rules are set forth in the form of tables. A table can list one or more preferred profiles, each comprising a number of features (including any parameters associated with a feature). For each feature listed, the table can specify whether the feature is to be added to the features already listed in the subscriber's provisioned profile, deleted from the features listed in the subscriber's provisioned profile, or modified to set one or more parameters of the feature to specified values.

BRIEF DESCRIPTION OF THE DRAWINGS

FIG. 7 illustrates an exemplary Preferred Profile Table used in the method of FIGS. 5A-B.

FIG. 8 illustrates an exemplary Advanced Screening Table used in the method of FIGS. 5A-B.

FIG. 9 illustrates an exemplary Dynamic Screening Tables used in the method of FIGS. 5A-B.

DETAILED DESCRIPTION

Figure 1:
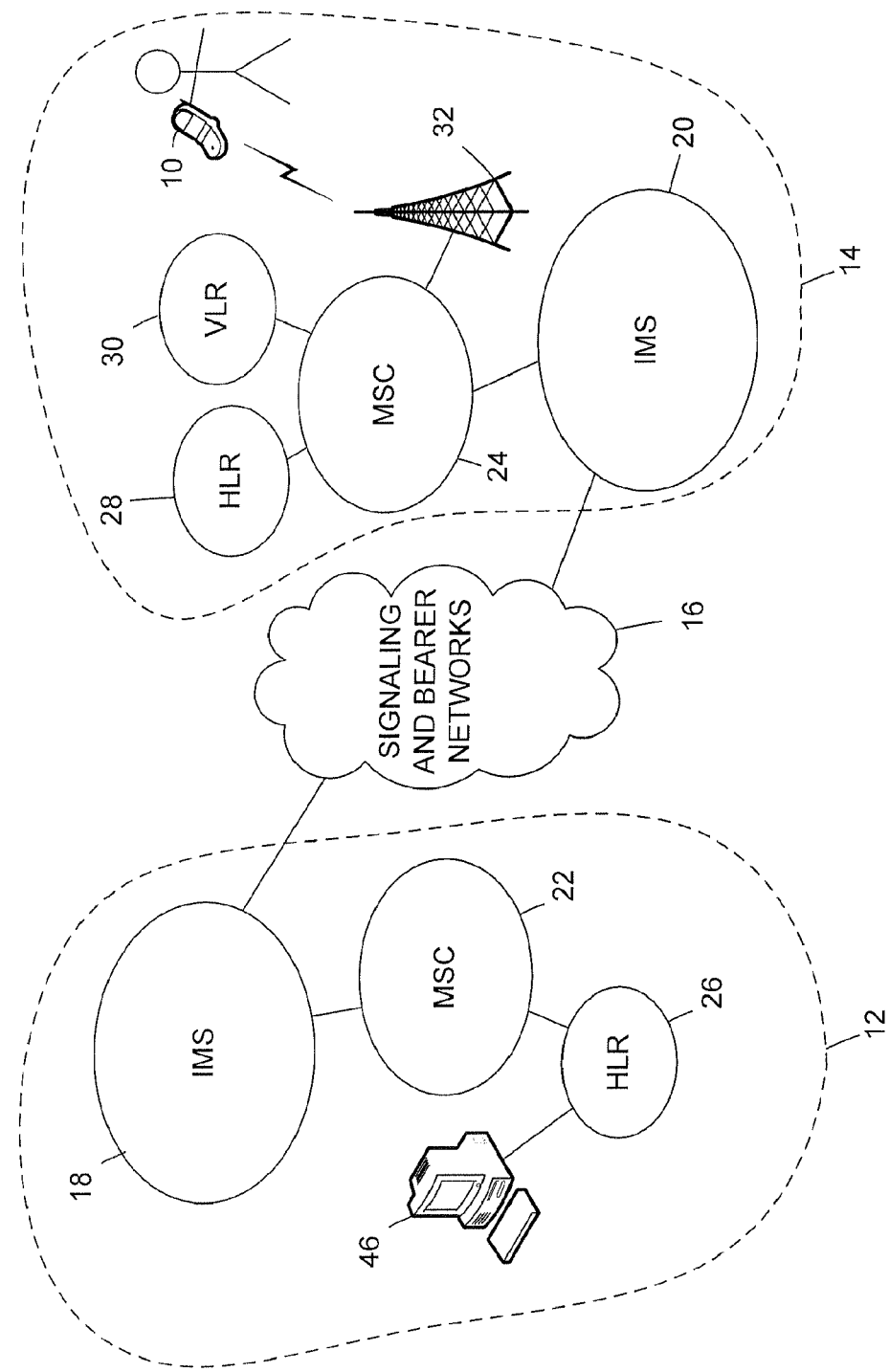
FIG. 1 illustrates a home network to which a subscriber subscribes and a visited network on which the subscriber is roaming, in accordance with an exemplary embodiment of the invention.

In the following description, like reference numerals indicate like components to enhance the understanding of the invention through the description of the drawings. Also, although specific features, configurations, arrangements and steps are discussed below, it should be understood that such specificity is for illustrative purposes only. A person skilled in the relevant art will recognize that other features, configurations, arrangements and steps are useful without departing from the spirit and scope of the invention. Unless specifically noted otherwise, the order in which method steps are described is for illustrative purposes only, and such steps can be arranged in any other suitable order, combined with each other or additional steps, or divided into more steps, in any suitable manner.

In FIG. 1, a mobile station (MS) 10 having a home network 12 is shown roaming on another network ("visited network") 14. Networks 12 and 14 are Public Land Mobile Networks (PLMNs), i.e., publicly accessible networks that communicate with cellular telephones or other such mobile stations using land-based (wireless) radio transmission. One or more signaling and bearer networks 16 are disposed in the communication path between networks 12 and 14 and are involved in the roaming process, as well understood in the art. The manner in which the system enables MS 10 to communicate and roam is well understood in the art and therefore not described herein except as needed. As described below, the exemplary embodiment of the invention relates to applying a predetermined rule set to a provisioned subscriber profile, to generate a roaming profile to be used when the subscriber's MS 10 is roaming.

In the exemplary embodiment, home and visited networks 12 and 14 each includes Internet Protocol (IP)-based elements that are characteristic of third-generation (3G) GSM technology (or at least what is sometimes referred to in the art as 2.5G technology). For example, home and visited networks 12 and 14 each includes an IP Multimedia Subsystem (IMS) 18 and 20, respectively. Nevertheless, in other embodiments of the invention the home and visited networks can be embodied in any suitable network technologies of any suitable so-called "generation," including base (2G) GSM technology and related GSM enhancement technologies, iDEN, UMTS, COMA, TDMA, etc.

In the exemplary embodiment, as in various GSM-based technologies, home and visited networks 12 and 14 each also includes a Mobile Switching Center (MSC) 22 and 24, respectively, and its associated Home Location Register (HLR) 26 and 28, respectively. The Visitor Location Register (VLR) 30 of network 14 is also shown, as it is involved in the method described below. Each network 12 and 14 also includes a number of base station subsystems (only one of which is shown for purposes of clarity) 32 that provide the radio links with the mobile stations (e.g., MS 10). Other elements that are commonly included in such networks can also be included, but for purposes of clarity are not shown, as they do not directly pertain to the system and method of the present invention. It should be noted that while in the exemplary embodiment of the invention the descriptions of the system and method refer to a "Home Location Register" and "Visitor Location Register," such elements may be referred to by other names where the invention is embodied in other network technologies. Likewise, their internal structures described below are intended only to be exemplary.

Figure 2:
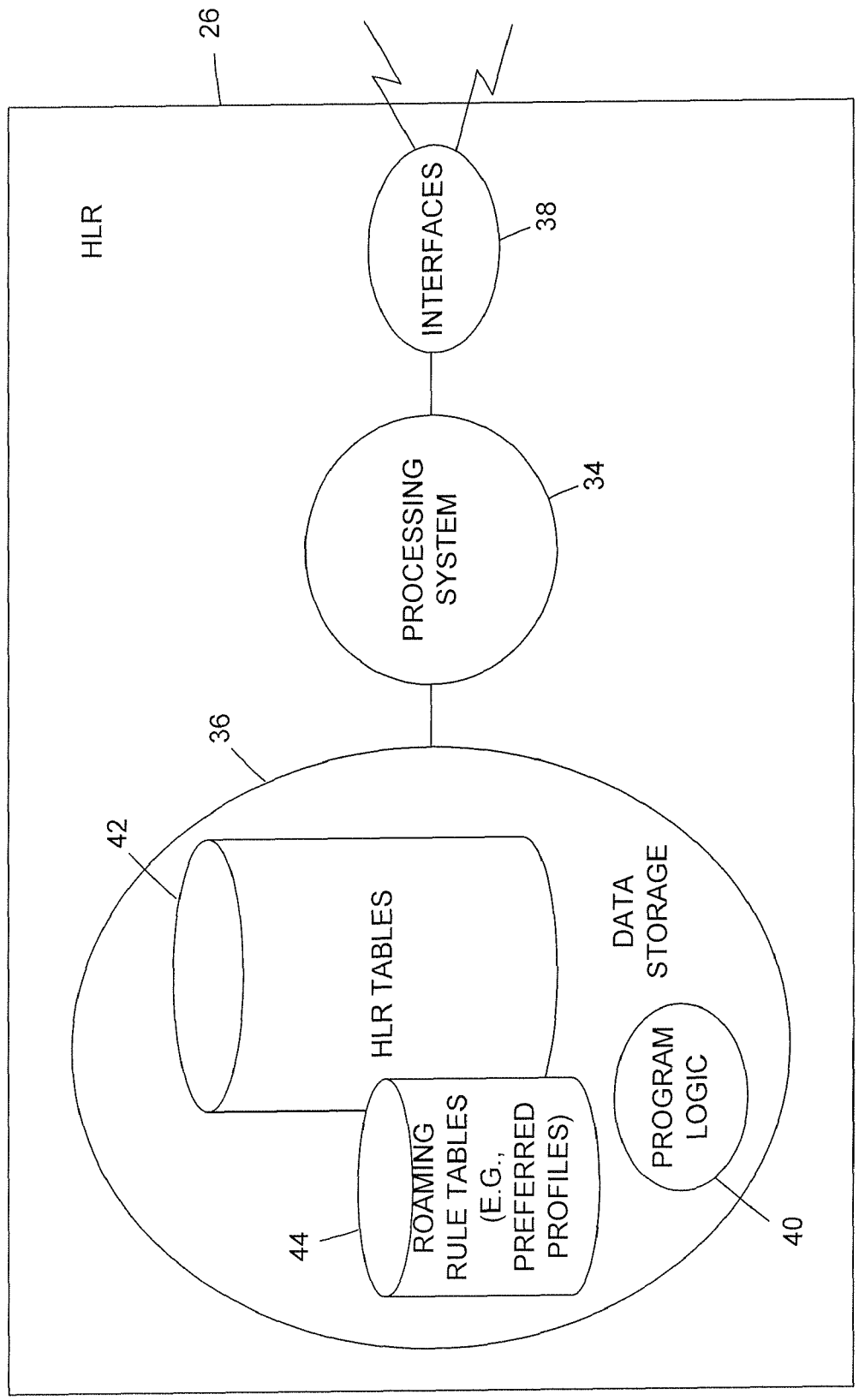
FIG. 2 is a block diagram of a Home Location Register of the home network of FIG. 1.

As HLR 26 of home network 12 is essentially an intelligent or computer-based telecommunications device, it accordingly includes a suitable processing system 34, data storage system 36, and interfaces 38, as illustrated in FIG. 2. Other elements that are commonly included in commercially available HLRs can be included in HLR 26 but are not shown for purposes of clarity. Indeed, HLR 26 can be of essentially conventional hardware design but programmed with novel program logic 40 or otherwise configured to effect the novel methods of the present invention. Program logic 40, conceptually shown for purposes of illustration as residing in data storage system 36, is part of the software with which HLR 26 is programmed. (Other such software is not shown in FIG. 2 for purposes of clarity but can include any suitable software that is conventionally included in an HLR or similar device.) Accordingly, processing system 34 operates in accordance with this programming to effect the methods of the present invention as well as conventional methods that provide conventional HLR functionality. It should be noted that the software elements as stored in data storage system 36 or otherwise recorded on one or more computer-readable media define a "computer program product" as that term is used in the patent lexicon. Data storage system 36 can include devices of any suitable medium, such as random-access memory, read-only memory, FLASH memory, magnetic or optical disk storage, etc., or any suitable combination thereof. Also, although HLR 26 is shown as an integral or unitary device, in other embodiments of the invention the functions described herein as performed by HLR 26 can be performed by a combination of any suitable number of devices located anywhere in the networks.

In addition to program logic 40 and other such program software, data storage system 36 stores HLR tables 42 and roaming rule tables 44. HLR tables 42 indicate in the conventional manner the features with which the subscriber, i.e., the user of MS 10 (FIG. 1) is provisioned, and any parameters associated with those features, as described in further detail below. The list of provisioned features and parameters is sometimes referred to in the art as the subscriber's (account) profile. The telecommunications service provider or carrier, i.e., the business entity that operates home network 12, can create the subscriber's profile when the subscriber opens an account with the carrier or at any other suitable time. To create or change profiles, authorized personnel acting on behalf of the carrier can access HLR tables 42 (typically, via an application server, which is not shown for purposes of clarity) using a suitable computer 46 (FIG. 1) or terminal. Although a direct connection between computer 46 and HLR 26 is shown in FIG. 1 for purposes of illustration, the connection can alternatively be via an intermediary computer network, including various servers or other intermediary devices. Personnel can similarly access roaming rule tables 44 via computer 46 to create, modify, delete, etc., the various tables described below.

Figure 3:
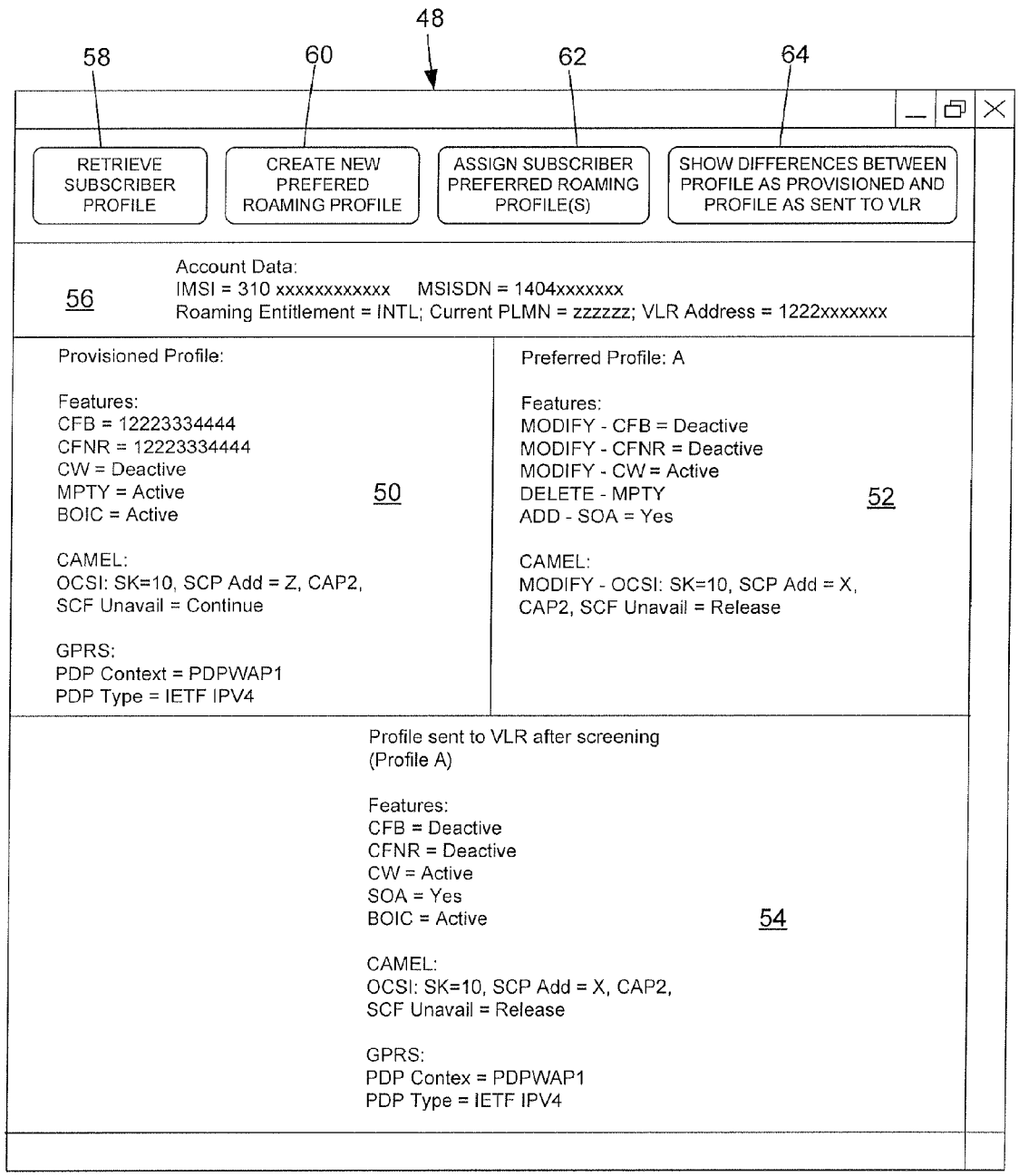
FIG. 3 illustrates a graphical user interface through which home network personnel can create and assign roaming rules to subscribers in the exemplary embodiment.

Computer 46 can be programmed or configured to provide a graphical user interface (GUI)-based software tool to facilitate accessing tables 44. As illustrated in FIG. 3, an exemplary GUI screen 48 has three windows: a first window 50 that displays a representation of the subscriber's profile as provisioned; a second window 52 that displays a representation of the subscriber's "preferred profile," which as described below embodies a set of rules to be applied to the provisioned profile; and a third window 54 that displays a representation of the modified profile that results from applying the rules to the provisioned profile. This arrangement allows the user to view the differences between the provisioned profile and the modified profile. Screen 48 further includes a window 56 that displays the subscriber's account data, such as the International Mobile Station Identity (IMSI) and/or Mobile Station Integrated Services Digital Network (ISDN) number (MSISDN) of MS 10 (FIG. 1), the subscriber's overall roaming entitlement, and the identity of the current (i.e., at the time this software tool is used) PLMN (or its VLR) in which the subscriber is roaming. Graphical control elements such as buttons 58, 60, 62 and 64 are provided through which the user can retrieve a subscriber's provisioned and preferred profiles (e.g., by entering the IMSI or MSISDN when prompted), create new profiles, assign the created profiles to subscribers, and display the information as shown in windows 50, 52 and 54.

As described in further detail below, each preferred profile embodies or represents a rule set to be applied to the provisioned profile on a per-subscriber basis. That is, as described below, the carrier can assign one or more preferred profiles to each of a number of subscribers through the use of this software tool. The carrier can select or create a preferred profile that the carrier deems most suitable for a particular subscriber, based upon various factors, including the subscriber's own preferences. For each feature listed in the preferred profile, there is a corresponding action listed: Add, Delete, or Modify (or Change). As described below, program logic 40 (FIG. 2) responds to the action listed for a corresponding feature by adding the feature to those existing in the provisioned profile, deleting the feature from those listed in the provisioned profile, or modifying the parameters of the feature in the provisioned profile. For example, the exemplary preferred profile indicated in window 52 lists the following features and associated actions: Call Forwarding Busy (CFB), for which the associated action is to modify the status (parameter) of that feature to Deactive (from an Active status or other status that may have been listed in the provisioned profile); Call Forwarding No Reply (CFNR), for which the associated action is to change the status (parameter) of that feature to Deactive (from an Active status or other status that may have been listed in the provisioned profile); Call Waiting (CW), for which the associated action is to change the status (parameter) of that feature to Active (from a Deactive status or other status that may have been listed in the provisioned profile); Multiparty (MPTY) calling, for which the associated action is to delete the feature from the profile, i.e., to not include it in the modified profile; and Suppression of Announcement (SOA), for which the associated action is to add the feature to the profile, i.e., to include it in the modified profile. This exemplary preferred profile further lists Original CAMEL Subscription Information (OCSI) parameters to be modified: the Service Key (SK) is to be set to a value of "10"; the Service Control Point node address is to be set to a value of "X"; the CAMEL Application Part (CAP) version or phase number is to be set to "CAP2"; and the Service Control Function (SCF) Unavailable parameter is to be set to Release.

The provisioned profile features shown in window 50 and preferred profile features shown in window 52 are intended only to be exemplary, for purposes of illustrating an embodiment of the invention, and constitute only a few of the many known mobile telecommunications features which persons skilled in the art understand are listable in HLR-related tables. Such persons will readily be able to create and assign to subscribers preferred profiles that set forth any such features and their parameters.

As described below in further detail, the result of applying a rule set (which, in the exemplary embodiment comprises a table-like "preferred profile") is a modified profile, such as the exemplary modified profile indicated in window 54. That is, the modified profile includes all of the features listed in the provisioned profile except for those that the preferred profile indicated are to be deleted, plus those that the preferred profile indicated are to be added. Parameters of features in the modified profile that the preferred profile indicated are to be modified may be different from those listed in the provisioned profile. Thus, for example, applying the preferred profile indicated in window 52 to the provisioned profile indicated in window 50 results in the modified profile indicated in window 54. Thus, the exemplary modified profile indicated in window 54 lists the following features and associated parameters: Call Forwarding Busy (CFB), with a Deactive parameter; Call Forwarding No Reply (CFNR), with a Deactive parameter; Call Waiting (CW), with an Active parameter; Suppression of Announcement (SOA), with a "Yes" parameter; Barring of Outgoing International Call (BOIC), with an Active parameter; an OCSI Service Key (SK) parameter of "10"; an OCSI Service Control Point node address parameter of "X"; an OCSI CAP phase number parameter of "CAP2"; an OCSI SCF Unavailable parameter of Release; a General Packet Radio System (GPRS) Packet Data Protocol (PDP) Context parameter of "PDPWAP1"; and a GPRS PDP Type parameter of "IETF IPV4". Note that the BOIC and GPRS features were originally included in the provisioned profile indicated in window 50 and were carried over to the modified profile unchanged because the preferred profile did not indicate to delete or modify them.

Figure 4:
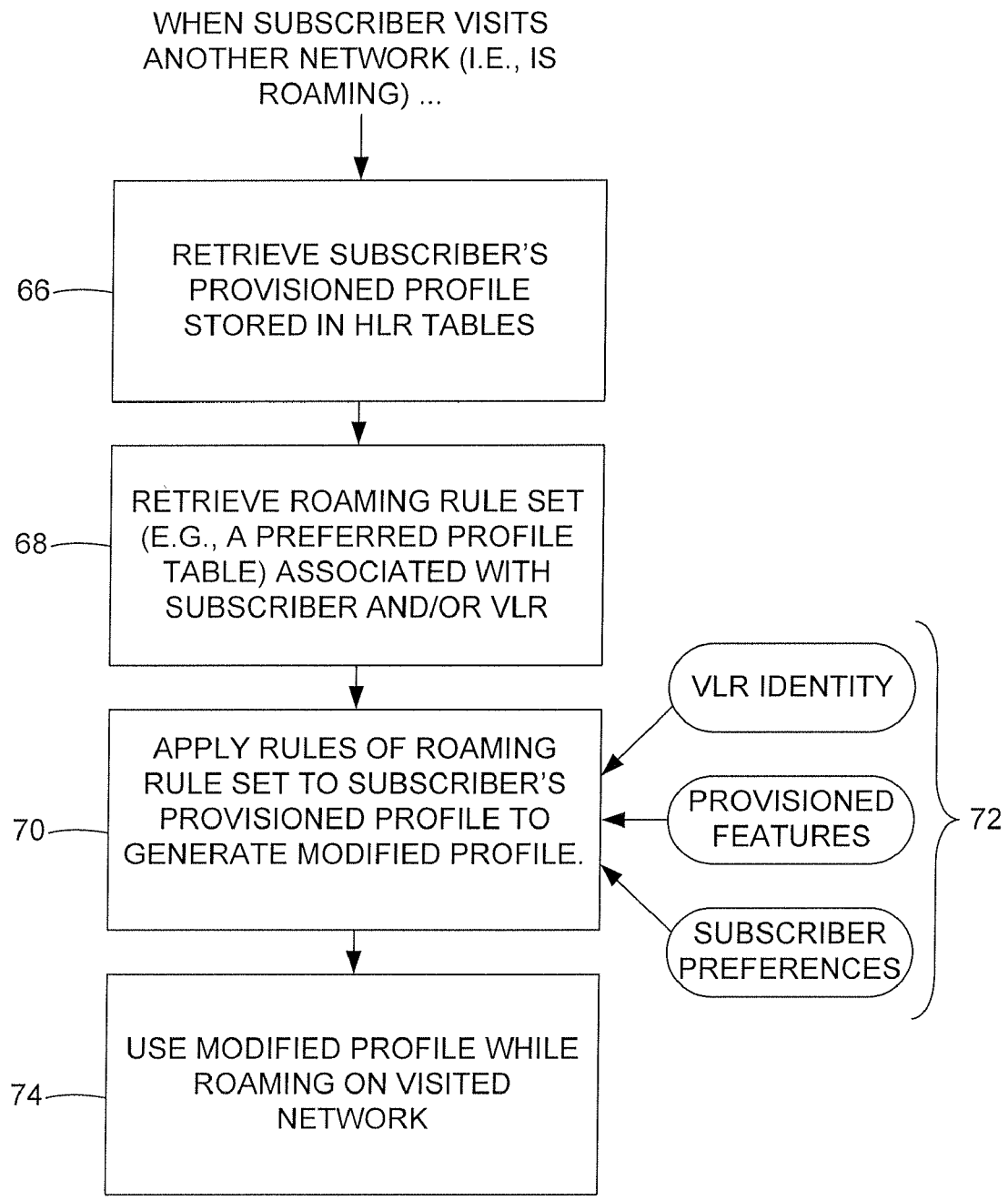
FIG. 4 is a flow diagram illustrating an exemplary method for generating a subscriber roaming profile using the roaming rules.

As illustrated in FIG. 4, in the exemplary embodiment the method of the present invention occurs when a subscriber visits a network 14 (FIG. 1) other than the subscriber's home network 12, i.e., the subscriber is roaming. Nevertheless, in other embodiments of the invention the method can occur at any other suitable time. As noted above with regard to FIG. 2, the method is effected by the execution of program logic 40 by processing system 34, in conjunction with other, conventional steps performed by HLR 26 and other system elements (not described herein for purposes of clarity).

At step 66, the system retrieves from data storage system 36 (FIG. 2) the subscriber's provisioned profile, in essentially the same manner as a conventional HLR would retrieve a subscriber's provisioned profile for roaming purposes. At step 68, the system also retrieves a roaming rule set from data storage system 36. As described in further detail below, in the exemplary embodiment the rule set is in the form of table-based logic. In other embodiments, the rule set can be in any other suitable form. At step 70, the system applies the rules of the rule set to the provisioned profile to generate a modified profile. The rules can be responsive to any suitable inputs 72, including on what VLR (or rather, PLMN) the subscriber is roaming, the provisioned profile features themselves, and subscriber preferences. That is, the rules can take into account the VLR, and generate different modified profiles depending upon the network (and its capabilities) on which the subscriber is roaming. Likewise, the rules can take into account the provisioned features themselves. For example, a rule can specify that when a subscriber is provisioned with feature "A" having a parameter "P" with a value of "n", and the subscriber is roaming on network "X," then the modified profile is to have feature "A" but with parameter "P" changed or set to a value of "m", and that an additional feature "B" (that may or may not have been in the provisioned profile) is to be included in the modified profile.

The rules can also take into account subscriber preferences. For example, a corporate or business subscriber can elect to limit the features available to an employee when the employee is roaming on a foreign country network so that the employee is unable to use features that the employee may use in the home country but which would be more expensive to use in the foreign country. Such a business subscriber can make preferences known to the subscriber's carrier, who ensures the preferences are reflected in the preferred profile or other roaming rules that the carrier creates for the subscriber's employees.

The general method of the present invention by which a rule set is applied to a base or provisioned profile to generate a modified profile can be referred to herein for purposes of convenience as "advanced roaming control" or "advanced screening," terms which are intended to differentiate the method from the crude screening or filtering that may be performed conventionally when a subscriber is roaming. Step 74 indicates that the modified profile is then used in the conventional manner, in place of the provisioned profile (or a conventionally screened or filtered version thereof) while the subscriber is roaming.

Figure 5A:
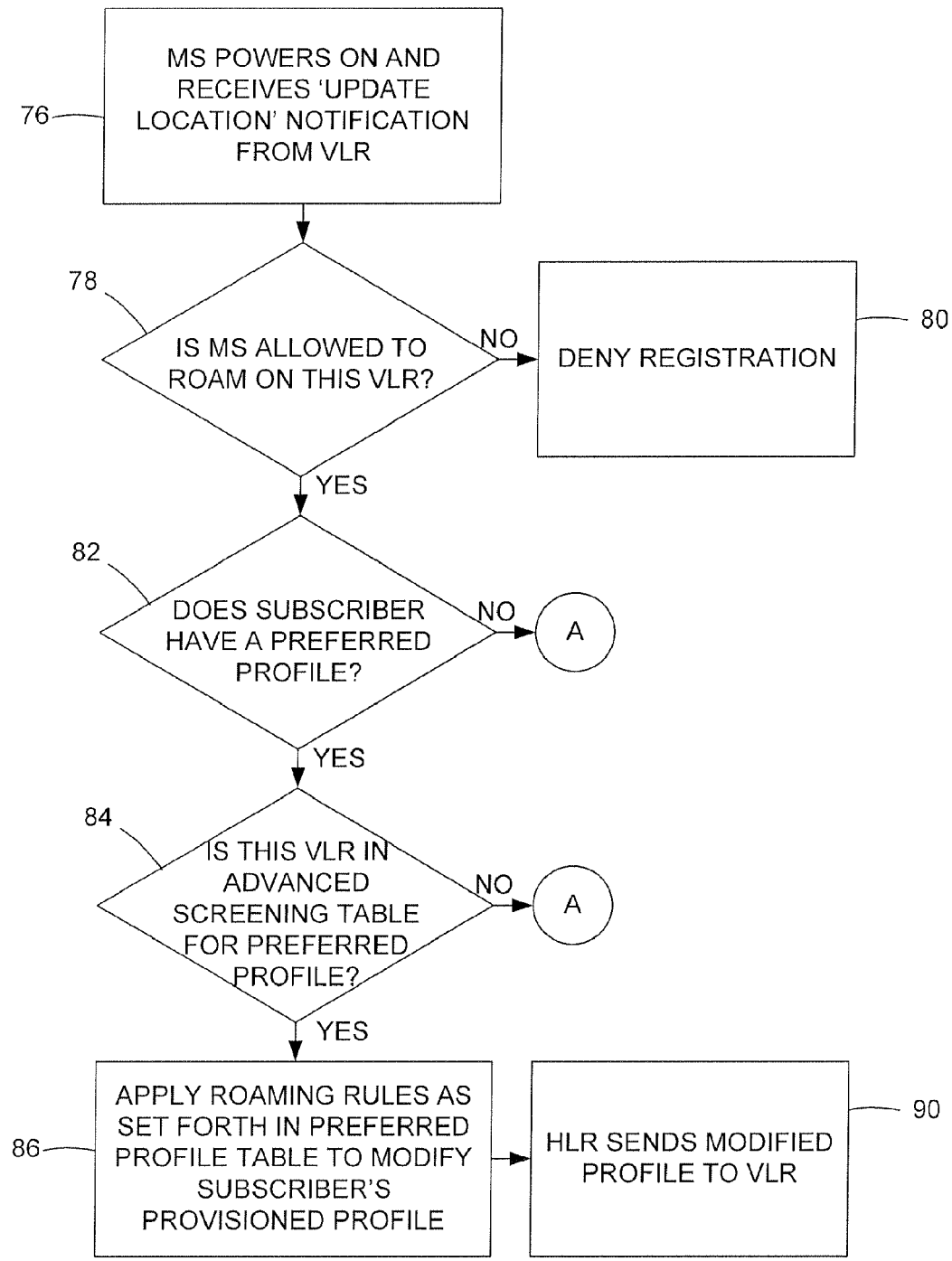
FIG. 5A is a flow diagram illustrating in further detail an exemplary method for generating a subscriber roaming profile using the roaming rules.
Figures 5B, 6:
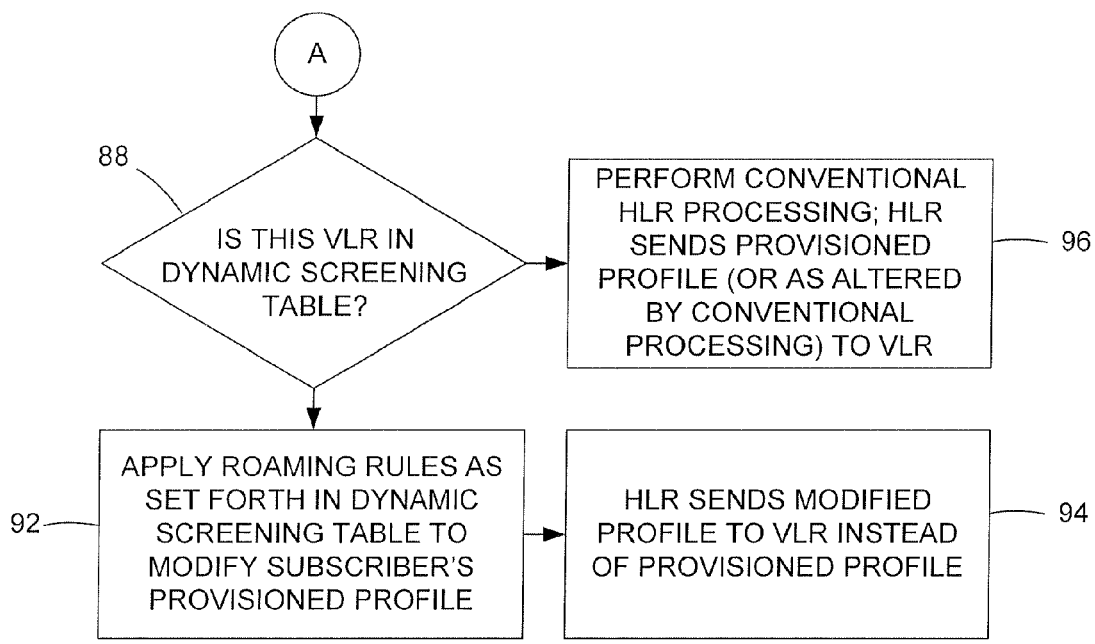
FIG. 5B is a continuation of the flow diagram of FIG. 5A.
FIG. 6 illustrates an exemplary general HLR table used in the method of FIGS. 5A-B.

An exemplary method is illustrated in further detail in FIGS. 5A-B and with further regard to FIG. 1. As noted above, in the exemplary embodiment of the invention the method is primarily effected by the programmed operation of HLR 26. At step 76, MS 10 powers-on or otherwise causes a registration sequence to occur in a network other than home network 12, such as visited network 14. In accordance with the conventional registration process that occurs in a GSM network, HLR 26 receives an Update Location message from the VLR 30 (i.e., the Visitor Location Register on which the subscriber is attempting to roam in this instance). As known in the art, the Update Location message represents a request by VLR 30 to HLR 26 for the subscriber's profile. In response, HLR 26 can access an HLR table such as one along the lines of that shown in FIG. 6. As in a conventional HLR table, the table lists the home network subscribers (e.g., by IMSI) along with each subscriber's provisioned profile and a range of VLRs (PLMNs) on which the subscriber is permitted to roam. However, in accordance with the exemplary embodiment of the present invention, the HLR table further lists preferred profiles that at least some of the subscribers may have. As it is contemplated some subscribers may not wish to participate in the advanced screening process, or the carrier may not offer advanced screening to some subscribers, those subscribers do not have preferred profiles.

Also note that the preferred profiles in the HLR table shown in FIG. 6 are identified by a label, such as "A", "B", "C", etc., while the provisioned profiles comprise lists of features. It is contemplated that the carrier may prefer to define a number of semi-customized preferred profiles, rather than define an individual preferred profile for each subscriber. Thus, for example, if a carrier contemplates that a certain preferred profile may be desirable for many customers, the carrier may identify that preferred profile as "A". An exemplary Preferred Profile Table is shown in FIG. 7 that lists three exemplary preferred profiles, "A", "B" and "C", which are used as described below.

Referring again to FIGS. 5A-B, at step 78 the system determines if the subscriber is permitted to roam on VLR 30 by consulting the HLR table (FIG. 6). (Note that it is common for those skilled in the art to which the invention relates to informally refer to a subscriber "roaming on a VLR" rather than a subscriber "roaming on the network" having the specified VLR; it is understood that the statements are synonymous.) Checking whether a subscriber is permitted to roam on a VLR is conventional, and if the subscriber is not permitted, to deny registration, as indicated by step 80.

At step 82, the system determines if the subscriber has a preferred profile by consulting the HLR table (FIG. 6). If the subscriber has a preferred profile, then at step 84 the system determines if VLR 30 is listed in the Advanced Screening Table (FIG. 8). The Advanced Screening Table lists ranges of VLR identification numbers. It also lists an Advanced Screening Number for each such range. Note that the Preferred Profile Table shown in FIG. 7 also lists the Advanced Screening Number for each preferred profile. If the subscriber's preferred profile has an Advanced Screening Number that matches that which is associated with a range listed in the Advanced Screening Table in which the identification number of VLR 30 falls, then at step 86 the system applies the roaming rules (i.e., as embodied in the subscriber's preferred profile) to the subscriber's provisioned profile. If not, or if it was determined at step 82 that the subscriber does not have a preferred profile, then the process proceeds to step 88, as described below. For example, as the HLR table shown in FIG. 6 lists the subscriber whose IMSI begins with the digits "310" as having preferred profile "A", and as the Preferred Profile Table shown in FIG. 7 lists preferred profile "A" as having Advanced Screening Number "1", the Advanced Screening Table shown in FIG. 8 indicates that the system is to apply the roaming rules to the subscriber's provisioned profile only if the VLR on which the subscriber is attempting to roam has an identification number between "1222" and "1230".

In the exemplary embodiment, applying the roaming rules to the subscriber's provisioned profile at step 86 comprises performing one or more of the "Add," "Modify" (or "Change") and "Delete" actions described above with regard to FIGS. 3-4 to generate a modified profile. That is, the modified profile includes all the features listed in the provisioned profile, plus those for which the preferred profile indicates an "Add" action, minus those for which the preferred profile indicates a "Delete" action. Also, the values of any parameters associated with the features included in the modified profile are set (i.e., "Modified" or "Changed") to the values indicated in the preferred profile. After the modified profile has been generated, it is sent to VLR 30, as indicated by step 90. The modified profile is sent in the same manner as the provisioned profile would have been sent conventionally. That is, HLR 26 responds to the Update Location message by transmitting an Insert Subscriber Data message, containing the subscriber's profile information, to VLR 30.

As described above, if the subscriber has no preferred profile, or if the subscriber's preferred profile is not applicable to the VLR on which the subscriber is attempting to roam, some advanced screening can nonetheless occur, but on the basis of the identity of the VLR alone rather than on the basis of a preferred profile (or combination of preferred profile and VLR). As described above, the rules embodied in the preferred profile can be responsive to the identity of the VLR, to the features listed in the provisioned profile, to subscriber preferences, or any suitable combination thereof. Step 88 is performed in instances in which the rules are responsive to or based upon only the identity of the VLR. At step 88, the system determines whether the VLR is in the Dynamic Screening Table (FIG. 9). Like the Preferred Profile Table and Advanced Screening Table, the Dynamic Screening Table is included in the roaming rule tables 44 stored in data storage system 36.

The Dynamic Screening Table lists ranges of VLR identification numbers, such as the exemplary "1222"-"1230" range in the exemplary table shown in FIG. 9. For each range, there is a corresponding list of features and actions, similar to those of the preferred profiles described above. If the VLR on which the subscriber is attempting to roam (e.g., VLR 30 or network 14 in FIG. 1) is included in one of the listed ranges, the system generates a modified profile by performing the actions on the subscriber's provisioned profile, as indicated by step 92. For example, the table shown in FIG. 9 indicates to set or modify CAMEL OSCI parameter SK to a value of "10", the SCP address parameter to a value of "Y", the version or phase parameter to "CAP2", and the SCF Unavailable parameter to "Release", as well as to delete the MPTY feature and to set or modify the SOA parameter to "Yes". After the modified profile has been generated, at step 94 it is sent to the VLR in the same manner as described above with regard to step 90. If it is determined at step 88 that the VLR is not in the Dynamic Screening Table, then at step 96 only conventional processing, such as simple filtering (rather than the advanced screening method of the present invention), is performed on the provisioned profile contents. The subscriber profile is then sent to the VLR in the same manner as described above, i.e., as part of the Insert Subscriber Data message.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method, comprising:
   detecting a subscriber is roaming on a visited network;
   retrieving, by a processor, a provisioned profile associated with the subscriber, the provisioned profile indicating a set of provisioned service features to which the subscriber subscribes;
   determining that the subscriber has preferred profiles stored at a database of a home network, each of the preferred profiles including roaming rules for a visited network and configured to modify the subscriber's provisioned profile based on an identity of the visited network; and
   in response to determining that the subscriber has preferred profiles stored at a database of a home network:
      identifying a visiting location registry or the visited network and determining a preferred profile suited for the visited network from among the preferred profiles;
      applying the preferred profile to the provisioned profile by modifying the set of provisioned service features using the roaming rules of the preferred profile;
      generating a modified profile of the subscriber, the modified profile including the set of provisioned service features modified using the roaming rules of the preferred profile; and
      at the visiting location registry, receiving and applying the modified profile while the subscriber is roaming on the visited network.

2. The method of claim 1, wherein the set of provisioned service features modified using the roaming rules of the preferred profile comprises the set of provisioned service features and at least one additional service feature.

3. The method of claim 1, wherein the set of provisioned service features modified using the roaming rules of the preferred profile is a subset of the set of provisioned service features.

4. The method of claim 1, wherein at least one of the set of provisioned service features has at least one parameter indicated in the provisioned profile, the at least one parameter having a value, and wherein the modified profile is generated based on the value.

5. The method of claim 1, wherein the set of provisioned service features modified using the roaming rules of the preferred profile is generated based on an identity of the visited network.

6. The method of claim 5, wherein the set of provisioned service features modified using the roaming rules of the preferred profile is generated based, at least in part, on the identity of the visited network and the set of provisioned service features.

7. The method of claim 6, wherein the set of provisioned service features modified using the roaming rules of the preferred profile includes the set of provisioned service features and at least one service feature.

8. The method of claim 6, wherein the set of provisioned service features modified using the roaming rules of the preferred profile is a subset of the set of provisioned service features.

9. The method of claim 1, wherein the set of provisioned service features modified using the roaming rules of the preferred profile is generated based on a subscriber preference.

10. The method of claim 1, further comprising displaying an indication of a difference between the provisioned profile and the modified profile on a user interface.

11. A system comprising:
a processor; and
a data storage in communication with the processor, the data storage including a logic that is executed by the processor to perform operations comprising:
retrieving a provisioned profile associated with a subscriber in response to detecting the subscriber roaming on a visited network, the provisioned profile indicating a set of provisioned service features to which the subscriber subscribes;
determining that the subscriber has preferred profiles stored at a database of a home network, each of the preferred profiles including roaming rules for a visited network and configured to modify the subscriber's provisioned profile based on an identity of the visited network; and
in response to determining that the subscriber has preferred profiles stored at a database of a home network:
identifying a visiting location registry of the visited network, and determining a preferred profile suited for the visited network;
applying the preferred profile to the provisioned profile by modifying the set of provisioned service features using the roaming rules of the preferred profile;
generating a modified profile of the subscriber, the modified profile including the set of service features modified using the roaming rules of the preferred profile; and
at the visiting location registry, receiving and applying the modified profile while the subscriber is roaming on the visited network.

12. The system of claim 11, wherein the set of provisioned service features modified using the roaming rules of the preferred profile includes the set of provisioned service features and at least one additional service feature.

13. The system of claim 12, wherein the set of provisioned service features modified using the roaming rules of the preferred profile is a subset of the set of provisioned service features.

14. The system of claim 12, wherein at least one of the set of provisioned service features has at least one parameter indicated in the provisioned profile, the at least one parameter having a value that is changeable by the logic.

15. The system of claim 12, wherein the processor generates the set of provisioned service features modified using the roaming rules of the preferred profile based on an identity of the visited network.

16. The system of claim 12, wherein the processor generates the set of provisioned service features modified using the roaming rules of the preferred profile based on a subscriber preference.

17. A non-transitory computer-readable medium having a computer program product stored thereon, the computer program product comprising instructions that, when executed by a processor, cause the processor to perform operations including:
detecting a subscriber is roaming on a visited network;
retrieving a provisioned profile associated with the subscriber, the provisioned profile indicating a set of provisioned service features to which the subscriber subscribes;
determining that the subscriber has preferred profiles stored at a database of a home network, each of the preferred profiles including roaming rules for a visited network and configured to modify the subscriber's provisioned profile based on an identity of the visited network; and
in response to determining that the subscriber has preferred profiles stored at a database of a home network:
identifying a visiting location registry or the visited network and determining a preferred profile suited for the visited network from among the preferred profiles;
applying the preferred profile to the provisioned profile by modifying the set of provisioned service features using the roaming rules of the preferred profile; and
generating a modified profile of the subscriber, the modified profile including the set of provisioned service features modified using the roaming rules of the preferred profile.

18. The non-transitory computer-readable medium of claim 17, wherein the set of provisioned service features modified using the roaming rules of the preferred profile comprises the set of provisioned service features and at least one additional service feature.

19. The non-transitory computer-readable medium of claim 17, wherein the set of provisioned service features modified using the roaming rules of the preferred profile is a subset of the set of provisioned service features.

20. The non-transitory computer-readable medium of claim 17, wherein at least one of the provisioned service features has at least one parameter indicated in the provisioned profile, the at least one parameter having a value, and wherein the modified profile is generated based on the value.

* * * * *